United States Patent [19]

Helton

[11] Patent Number: 4,636,543

[45] Date of Patent: Jan. 13, 1987

[54] PROTECTIVE COATING COMPOSITION

[76] Inventor: Bob G. Helton, 4013 N. Star Rd., Garland, Tex. 75040

[21] Appl. No.: 789,759

[22] Filed: Oct. 18, 1985

[51] Int. Cl.[4] ............................. C08K 5/01; C08K 5/15
[52] U.S. Cl. .................................... 524/109; 427/155; 524/563; 524/569
[58] Field of Search .......................... 524/109; 427/155

[56] References Cited

U.S. PATENT DOCUMENTS

| | | | |
|---|---|---|---|
| 2,924,582 | 2/1960 | Mullins et al. | 524/109 |
| 4,093,686 | 6/1978 | Briston et al. | 428/159 |
| 4,159,973 | 7/1979 | Hoch et al. | 524/151 |
| 4,230,753 | 10/1980 | Sheyon | 428/218 |
| 4,302,489 | 11/1981 | Hattori et al. | 427/244 |

FOREIGN PATENT DOCUMENTS 2209815  7/1974  France ................................. 524/109

Primary Examiner—Herbert J. Lilling
Attorney, Agent, or Firm—Warren H. Kintzinger

[57] ABSTRACT

A composition solution of resinous polymeric material with the composition including polyvinyl chloride or polyvinyl chloride-polyvinyl acetate copolymer, a saturated vegetable oil release agent typically coconut oil, and a plasticizer such as epoxidized vegetable oil. The composition solution is useful for forming a temporary protective coating on glass, metal, and non-porous plastic or painted surfaces unaffected by the solution solvents. Another use for the composition solution is to provide a plastic permanent protective coating for substances such as sheet rock and wood. This not only presents a barrier to insect invasion such as by termites into wood but also presents a smooth surface on wood forms used as cement forms that gives effective release from cement molded thereon. It is a sealer surface for sheet rock ideal for the mounting of wall paper which when removed may be peeled therefrom without tearing of the sheet rock surface paper.

22 Claims, No Drawings

PROTECTIVE COATING COMPOSITION

This invention relates in general to protective coatings, and more particularly, to a composition solution forming a temporary protective coating when used on glass, metal, and plastic non-porous or painted surfaces, unaffected by the solution solvents, that may be easily peeled away therefrom, that when used on wood presents an effective barrier to insect invasion and presents a smooth release surface on the wood for effective easy release of wood forms from cement.

Cleanups with new construction, both residential and commercial can be a real problem even for those who are providing a commercial cleaning service cleaning new construction. There has been a pronounced need for something that would make window cleaning both easier and faster. Many substances have been tried including even Crisco and peanut oil with, however, it being found that removal of some of these substances is more of a problem than direct scraping removal of paint, mortar, texture and other substances that may have splashed, dropped, or deposited on glass and/or metal surfaces. The new substance comes in a liquid form that may be sprayed to coat surfaces for protection. The material forms a protective film temperary coating on glass, metal and plastic non-porous or painted surfaces unaffected by the solution solvents, that may be easily peeled away taking with it paint, mortar, mud and dust and any other foreign materials that may have been deposited thereon during construction. This temporary protective coating greatly reduces the use of razor blades, and abrasive cleaning agents that can scratch glass and even break glass. By not allowing direct contact of sand, mortar and cement and other foreign materials with glass during construction the costly service of replacing damaged glass with unscratched and unbroken glass and/or reglazing is reduced. This provides great savings in reduced replacement costs and also in reduced cleaning rates in many instances. As an easy pee-off temporary coating the material may be applied on formica ceramic (bathtubs), porcelain, marble, stainless steel, copper and aluminum.

The material is useful also for applications other than temporary protective coatings in that it can be sprayed or dip applied to porous surfaced materials or even, in some instances, to surfaces of materials that interact with solvents in the coating material. It provides a protective surface for wood that resists adverse deterioration from water and cement with wood used, for example, in concrete forms prolonging wood form life and also improving release of molded concrete from treated wood surfaces. This release characteristic is common to the peel-off release characteristic of the temporary protective coatings. An additional benefit is that the coating material provides an effective barrier for wood from insect invasion such as by termites. When used on sheet rock the coating material provides a sealer surface on the sheet rock ideal for the mounting of wall paper that when removal is desired the wall paper may be peeled therefrom without tearing of sheet rock surface paper.

It is therefor a principal object of this invention to provide a coating material having a surface with desired release characteristics from material surfaces it otherwise adheres to.

Another object is to protect glass and other materials from damage during building construction or remodeling.

A further object is to speed up cleanup after construction.

Still another object is to lower cleanup costs after construction and make the cleanup job easier.

Another object is to provide a surface protective material for wood and sheet rock having good release characteristics for substances brought in contact therewith.

A further object is to provide a protective barrier for wood from insect invasion.

Features of the invention useful in accomplishing the above objectives include, in a protective coating composition, a solution of resinous material including Polyvinyl Chloride or a mixture of Polyvinyl Chloride-Polyvinyl Acetate Copolymer, a saturated vegetable oil release agent typically Coconut Oil, and a plasticizer such as Epoxidized Vegetable Oil. This composition solution forms a temporary protective coating on glass, metal, and non-porous plastic or painted surfaces unaffected by the solution solvents. The same composition solution is also useful in providing long term plastic protective coatings for porous materials such as sheet rock and wood that are an effective barrier to insect invasion. It also presents a smooth effective release surface on wood forms used as cement molding forms. When used as a sealer surface for sheet rock its release properties provide that wall paper mounted thereon may be easily peeled therefrom without tearing of the sheet rock surface paper.

In a preferred embodiment, the mixture of the present invention comprises, by weight, a mixture of non-volatile materials in the range of 15% to 35% and volatile materials in the range of 65% to 85%. The non-volatile portion includes Vinyl Chloride resin in the range of 40% to 70% thereof, a release agent in the range of 5% to 15% thereof, and plasticizers in the range of 20% to 45% thereof. The volatile portion includes Ketone in the 25% to 100% range thereof, and aromatics in the 0% to 75% range thereof.

In the non-volatile portion Vinyl Chloride resin is Vinyl Chloride or a Vinyl Chloride mix with Vinyl Acetate in the range from 1% to 14% of the mix, the release agent is a saturated vegetable oil such as Coconut Oil, and the plasticizer consists principally of an epoxidized vegetable oil such as epoxidized soy bean oil, or Phthalate and/or sebacate plasticizers normally used with the mentioned vinyl resins. These are family related only in being plasticizers and are not necessarily chemically similar.

In the volatile portion the Ketone solvents are methyl ethyl ketone and/or methyl isobutyl ketone however, other slower ketone solvents can be used if the application permits. The aromatic solvents are toluene and/or xylene with slower aromatics also useable for certain applications.

When the mixture consituted as set forth is sprayed on surfaces to provide a peel-off protective film, on glass for example, it takes approximately 4 to 5 minutes for it to dry. It should be noted that the product mix may have the non-volatile portion mixed with a greatly reduced amount of volatile materials for savings in shipment with volatile thinner materials added by the receiver to bring the product mix to proper consistency for spray or dip application producing a plastic protective film on non-porous materials, or surface on wood or other porous materials. The coating provided consists of a Vinyl Chloride or Vinyl Chloride-Vinyl Acetate resin in combination with a release agent consisting of a saturated vegetable oil, and a plasticizer consisting principally of an epoxidized vegetable oil. These ingredients are deposited as a plastic out of a solution including a solvent or combination of solvents (volatiles) suitable for the application. The saturated vegetable oil is selected as a most suitable release agent, however, other release agents such as mineral oil in combination with caster oil can be used for certain applications.

In selecting as a plasticizer epoxidized vegetable oil its low volatility and resistance to migration into the supporting substrate along with its stabilizing effect on the vinyl chloride resin were considered properties of prime importance. It should be noted that plasticizers selected from the phosphate, citrate, phthalate, or sebacate families can be used in combination with the epoxidized vegetable oil in some applications where the film property requirements are less demanding.

In the overall mix of non-volatile and volatile materials with the solvents brought up to the levels for application of mixture embodiments in the desired ingredient approximate percentages by weight include Vinyl Chloride resin in the range of 6% to 25%, the release agent in the range of 1% to 5%, plasticizer(s) in the range of 3% to 16% Ketone in the range of 16% to 85% and aromatics in the range of 0% to 64%. Vinyl Acetate in a range up to 3% is includable in a mix with the Vinyl Chloride as an additional non-volatile ingredient in another embodiment mixture range.

Whereas this invention has been described with respect to several related mixture embodiments thereof, it should be realized that various changes may be made without departure from the essential contributions to the art made by the teachings hereof.

I claim:

1. A protective coating solution composition comprising: a mixture of non-volatile materials in the range of 15% to 35% by weight and volatile materials in the range of 65% to 85% by weight; with the non-volatile portion containing Vinyl Chloride resin in the range of 40% to 70% thereof, a release agent in the range of 5% to 15% thereof, and a plasticizer primarily of epoxidized vegetable oil in the range of 20% to 45% thereof; with the volatile portion including Ketone in the 25% to 100% range thereof, and aromatics in the 0% to 75% thereof; and wherein said release agent is a saturated vegetable oil.

2. The mixture of non-volatile materials of claim 1, wherein said saturated vegetable oil is Coconut Oil.

3. The mixture of non-volatile materials of claim 1, wherein a Phthalate plasticizer is included with said epoxidized vegetable oil.

4. The mixture of non-volatile materials of claim 1, wherein a Sebacate plasticizer is included with said epoxidized vegetable oil.

5. The mixture of non-volatile materials of claim 1, wherein a mixture of Phthalate and sebacate plasticizers is included with said epoxidized vegetable oil.

6. A mixture of non-volatile materials for a protective coating solution with volatile materials in the range of 65% to 85% by weight and with the non-volatile materials comprising: Vinyl Chloride resin material in the range of 40% to 70% thereof, a release agent in the range of 5% to 15% thereof, and a plasticizer in the range of 20% to 45% thereof primarily of epoxidized vegetable oil.

7. The mixture of non-volatile materials of claim 6, wherein said release agent is a mineral oil in combination with castor oil.

8. The mixture of non-volatile materials of claim 6, wherein said release agent is a saturated vegetable oil.

9. The mixture of non-volatile materials of claim 8, wherein said saturated vegetable oil is Coconut Oil.

10. The mixture of non-volatile materials of claim 8, wherein a Phthalate plasticizer is included with said epoxidized vegetable oil.

11. The mixture of non-volatile materials of claim 8, wherein a Sebacate plasticizer is included with said epoxidized vegetable oil.

12. The mixture of non-volatile materials of claim 8, wherein a mixture of Phthlate and Sebacate plasticizers is included with said epoxidized vegetable oil.

13. The mixture of non-volatile materials of claim 6, wherein said Vinyl Chloride resin material is in a mixture with the Vinyl Acetate resin with the Vinyl Acetate resin in the range of approximately 1% to 14% of the mix.

14. The mixture of non-volatile materials of claim 6, wherein said epoxidized vegetable oil is epoxidized soy bean oil.

15. A protective coating solution comprising: a mixture of non-volatile materials in the range of 15% to 35% by weight and volatile materials in the range of 65% to 85% by weight; with the non-volative portion containing Vinyl Chloride resin in the range of 40% to 70% thereof, a release agent in the range of 5% to 15% thereof, and a plasticizer primarily of epoxidized vegetable oil in the range of 20% to 45% thereof; with the volative portion including Ketone in the 25% to 100% range thereof, and aromatics in the 0% to 75% range thereof; and wherein said release agent is a mineral oil in combination with castor oil.

16. The mixture of non-volatile materials of claim 15, wherein said Vinyl Chloride resin material is in a mixture with the Vinyl Acetate resin with the Vinyl Acetate resin in the range of approximately 1% to 14% of the mix.

17. The mixture of non-volatile materials of claim 15, wherein said epoxidized vegetable oil is epoxidized soy bean oil.

18. The protective coating solution of claim 15, wherein said Ketone solvent is Methyl Ethyl Ketone.

19. The protective coating solution of claim 15, wherein said Ketone solvent is Methyl Isobutyl Ketone.

20. The protective coating colution of claim 15, wherein said Ketone solvent is a mixture of Methyl Ethyl and Methyl Isobutyl Ketone.

21. The protective coating solution composition of claim 15, wherein with coating applied to glass, metal and other non-porous material surfaces unaffected by the solution solvents an easy release peel-off protective film coating is provided that is a boon to building construction and remodeling cleaning service.

22. The protective coating solution composition of claim 15, wherein with coating applied to wood, sheet rock and porous material surfaces the protective coating solution forms a smooth plastic outer surface having easy release excellent for concrete forms with good release of molded concrete from treated wood surfaces, and easy peel-off release of wall paper from surface treated sheet rock walls when wall paper removal is desired without damage to sheet rock such as tearing of sheet rock surface paper.

* * * * *